US006550751B1

United States Patent
Brown et al.

(10) Patent No.: US 6,550,751 B1
(45) Date of Patent: *Apr. 22, 2003

(54) GAS-LIQUID CONTACTOR WITH LIQUID REDISTRIBUTION DEVICE

(75) Inventors: Gregory Norman Brown, Palmyra, PA (US); Raymond Raulfs Gansley, Lebanon, PA (US); Michael Lyn Mengel, Fredericksburg, PA (US); Eli Gal, Lebanon, PA (US)

(73) Assignee: Marsulex Environmental Technologies Corp., Lebanon, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 695 days.

(21) Appl. No.: 08/978,991

(22) Filed: Nov. 26, 1997

(51) Int. Cl.[7] .................................................. B01F 3/04
(52) U.S. Cl. ........................ 261/113; 261/117; 96/297; 96/326
(58) Field of Search ............................... 261/108, 113, 261/117, 97, 110; 95/213, 216, 221; 96/297, 326, 328

(56) References Cited

U.S. PATENT DOCUMENTS

| 1,048,425 A | * | 12/1912 | Pampe | 261/113 |
|---|---|---|---|---|
| 1,516,187 A | * | 11/1924 | Hanson | 261/113 |
| 1,669,638 A | * | 5/1928 | Wagner | 261/113 |
| 1,732,086 A | * | 10/1929 | Flippen | 261/113 |
| 1,866,443 A | | 7/1932 | Zumbro | |
| 2,596,106 A | * | 5/1952 | Schneible | 261/113 |
| 3,243,171 A | | 3/1966 | Eckert | 261/97 |
| 3,495,952 A | * | 2/1970 | Ulbrecht et al. | 261/108 |
| 3,533,608 A | * | 10/1970 | McClure | 261/117 |
| 3,631,656 A | * | 1/1972 | Hausberg et al. | 261/117 |
| 3,708,958 A | * | 1/1973 | Duty et al. | 261/117 |
| 3,841,060 A | * | 10/1974 | Hoad | 261/117 |
| 5,512,072 A | * | 4/1996 | Laslo | 261/117 |

FOREIGN PATENT DOCUMENTS

| DE | 1272889 | | 7/1968 | |
| FR | 595499 | * | 10/1925 | 261/117 |
| GB | 156490 | | 7/1922 | |
| IT | 565398 | * | 7/1957 | 261/117 |

OTHER PUBLICATIONS

Klingspor et al., *LS–2, Two Years of Operating Experience*, EPRI–DOE–EPA Combined Utility Air Pollutant Control Symposium (Aug. 25–29, 1997), p. 1–2, 14–16.

* cited by examiner

*Primary Examiner*—C. Scott Bushey
(74) *Attorney, Agent, or Firm*—Hartman & Hartman, P.C.; Gary M. Hartman; Domenica N. S. Hartman

(57) ABSTRACT

A gas-liquid contactor for removing gases and particulate matter from flue gases produced by processing operations of the type carried out in utility and industrial plants. The contactor is generally an open spray absorber having a spray tower (110) whose walls (114) form a passage within the tower (110). Flue gases are introduced into the tower (110) so as to flow vertically upward or downward through the passage. Disposed within the passage are heads (116) for introducing a liquid (118) into the passage such that the liquid (118) contacts the flue gases. A portion of the liquid (118) contacts the wall (114) of the tower (110), such that the portion of the liquid (118) flows downwardly along the wall (114). The tower (110) is equipped with a deflecting device (122) disposed on the wall (114) for deflecting the portion of the liquid (118) away from the wall (114), and thereafter reintroducing the portion of the liquid (118) into the passage so as to contact the gases flowing through the passage. The deflecting device (122) is also preferably configured to obstruct the flow of gases along the wall (114) in order to reduce gas penetration at the wall (114) and divert the gases toward the center of the passage where more efficient contact with the liquid (118) is made.

13 Claims, 2 Drawing Sheets

GAS-LIQUID CONTACTOR WITH LIQUID REDISTRIBUTION DEVICE

FIELD OF THE INVENTION

This invention generally relates to gas-liquid contactors used in the removal of particulate matter and acidic gases from utility and industrial combustion gases. More particularly, this invention is directed to an open spray absorber having a spray tower that is equipped with an internal structure that enhances the efficiency of the contactor by reintroducing into the gas flowing through the tower any liquid that has cohered to the tower walls.

BACKGROUND OF THE INVENTION

Gas-liquid contactors are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and therefore their emission into the atmosphere is closely regulated by clean air statutes. The method by which acidic gases are removed from flue gases while flowing through a spray tower or other type of gas-liquid contactor is known as wet flue gas desulfurization (FGD).

The cleansing action produced by a gas-liquid contactor is generally derived from flowing the flue gas upwardly through a tower countercurrently to a descending liquid, which contacts the flue gas and absorbs the acidic gases and particulate matter. Wet flue gas desulfurization processes typically involve the use of calcium-based slurries or sodium-based or ammonia-based solutions. As used herein, a slurry is a mixture of solids and liquid in which the solids content can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Such slurries react with the acidic gases to form slurries of sulfate and sulfite salts that can be collected for disposal or recycling. Intimate contact between the alkaline slurry and acidic gases present in the flue gases, such as sulfur dioxide, hydrogen chloride (HCl) and hydrogen fluoride (HF), result in the absorption of the gases by the slurry. Thereafter, the slurry can be accumulated in a tank.

A spray tower 10 is represented schematically in vertical and horizontal cross-section in FIGS. 1 and 2, respectively, for a gas-liquid contactor known as an open spray absorber. The tower 10 is generally an upright tubular-shaped structure having a wall 14 that defines a vertical passage. An inlet duct 12 serves to introduce combustion gases into the tower 10. Above the inlet duct 12 are multiple banks of spray nozzles 16 that each introduces a spray 18 of a cleansing liquid, such as one of the above-noted slurries or solutions, into the passage formed by the wall 14. The number of banks of nozzles 16 provided will vary in accordance with the requirements of a given application. Intimate contact between the spray 18 and the flue gases rising through the tower 10 results in a cleansing action, by which the liquid and the entrapped or reacted gases are collected at the bottom of the tower 10 in a tank (not shown). The cleansed gases that continue to rise through the tower 10 then typically pass through a mist eliminator (not shown), and thereafter are either heated or passed directly to the atmosphere.

The liquid introduced by the nozzles 16 is typically in the form of fine droplets, typically in the range of about 0.5 to 5 millimeters in diameter. As is evident from FIGS. 1 and 2, the spray 18 produced by a nozzle 16 within one bank overlaps the spray 18 from adjacent nozzles 16 of the same bank. The spray 18 from each nozzle 16 also overlaps the spray 18 emitted by nozzles 16 of lower banks as the spray 18 flows downwardly through the tower 10 under the influence of gravity. From FIG. 1, it can be seen that, even with multiple banks of nozzles 16, a true uniform slurry distribution in the tower 10 is not achieved due to wall effects. The sprays 18 from the nozzles 16 nearest the wall 14 impinge on the wall 14, such that the liquid flows downwardly on the surface of the wall 14 without contributing effectively to acid gas and particulate removal. Consequently, the spray concentration or density in an annular-shaped outer region 22 of the passage, shown generally as being between the outermost nozzles 16 and the wall 14, is lower than that in the central region 20 of the tower 10. Lower spray density in the outer region 22 results in low resistance to gas flow, such that the flue gases flow upward at relatively high velocities along the wall 14 of the tower 10. The combination of low spray concentration and higher gas velocity near the wall 14 results in a low liquid-to-gas ratio (L/G), high flue gas penetration, and a reduced absorber efficiency.

In view of the above, it can be appreciated that the efficiency of gas-liquid contactors of the type shown in FIGS. 1 and 2 are reduced by a nonuniform distribution of liquid within the spray tower, and that enhanced efficiencies could be achieved if a more uniform distribution were achieved or otherwise compensated for.

SUMMARY OF THE INVENTION

It is an object of this invention to provide a more efficient gas-liquid contactor for the removal of acidic gases and/or particulate matter from flue gases produced by utility and industrial facilities.

It is a further object of this invention that such a contactor is configured to redistribute liquid within the contactor in order to achieve enhanced absorption and removal of gases and particulate matter from flue gases.

It is another object of this invention that such a contactor is configured to reduce gas penetration along the walls of the contactor in order to achieve enhanced absorption and removal of gases and particulate matter from flue gases.

The present invention provides a gas-liquid contactor for removing gases and particulate matter from flue gases produced by processing operations of the type carried out in utility and industrial plants. The contactor is generally an open spray absorber having a spray tower whose walls form a passage within the tower. Flue gases are introduced into the tower through an inlet from which the flue gases flow vertically upward or downward through the passage. Disposed within the passage are heads for introducing a liquid into the passage such that the liquid contacts the flue gases. As used herein, the term "liquid" encompasses any of the slurries and solutions employed in the industry with gas-liquid contactors. A portion of the liquid introduced by the heads contacts the wall of the tower, such that the portion of the liquid flows downwardly along the wall. Finally, the tower is equipped with a deflecting device disposed on or near the wall for deflecting the portion of the liquid away from the wall, and thereafter reintroducing the portion of the liquid into the passage so as to contact the gases flowing through the passage. The deflecting device is also preferably configured to obstruct the flow of gases along the wall in order to reduce gas penetration at the wall and divert the gases toward the center of the passage where more efficient contact with the liquid is made. In a preferred embodiment, the deflecting device reintroduces the portion of the liquid deflected from the wall as droplets into the passage to promote the absorption efficiency of the reintroduced liquid.

From the above, it can be seen that a significant advantage of this invention is that the deflecting device serves to reintroduce into the gas stream any portion of the liquid adhering to the walls of the tower—liquid which otherwise would not contribute effectively to removal of gases and particulate matter from the flue gases. By also obstructing the flow of flue gases along the wall of the tower, the deflecting device greatly improves the liquid/gas ratio near the wall. As a result, gas penetration through the tower is significantly reduced and the overall efficiency of the gas-liquid contactor is significantly enhanced.

Other objects and advantages of this invention will be better appreciated from the following detailed description.

DETAILED DESCRIPTION OF THE INVENTION

Figure 1:
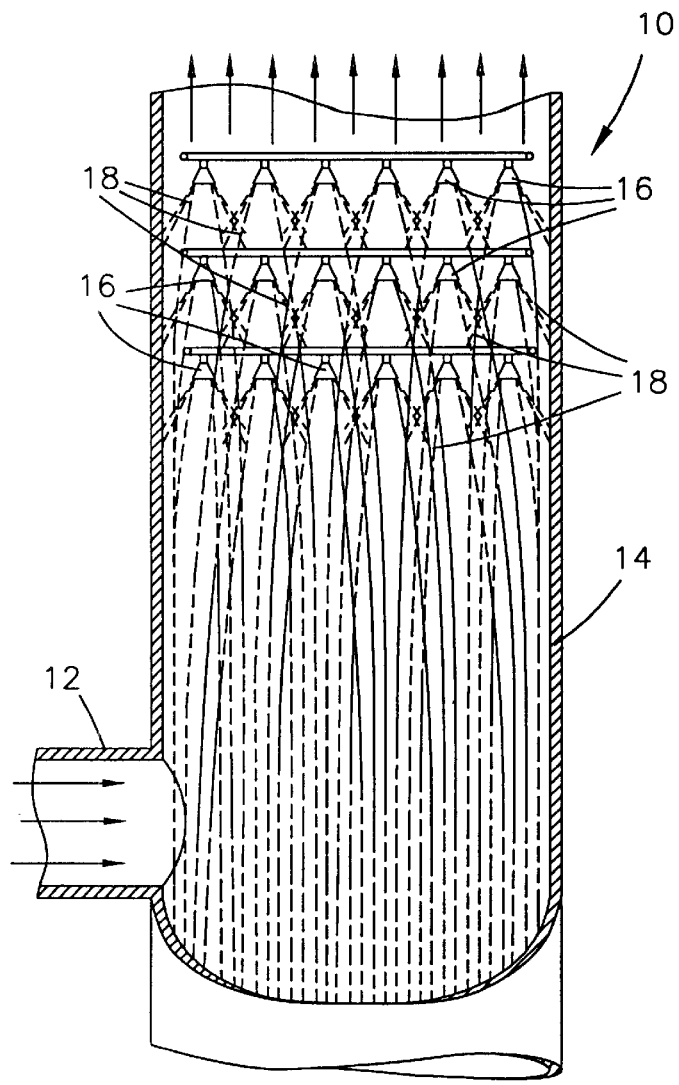
FIGS. 1 and 2 schematically show in vertical and horizontal cross-section, respectively, a spray tower of a type known in the prior art.
Figure 2:
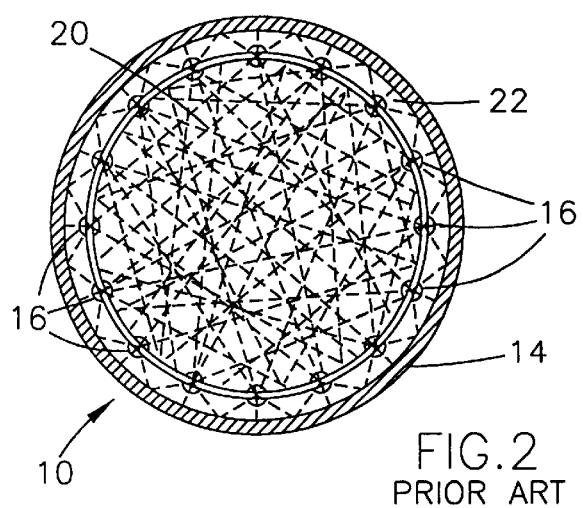
Figure 3:
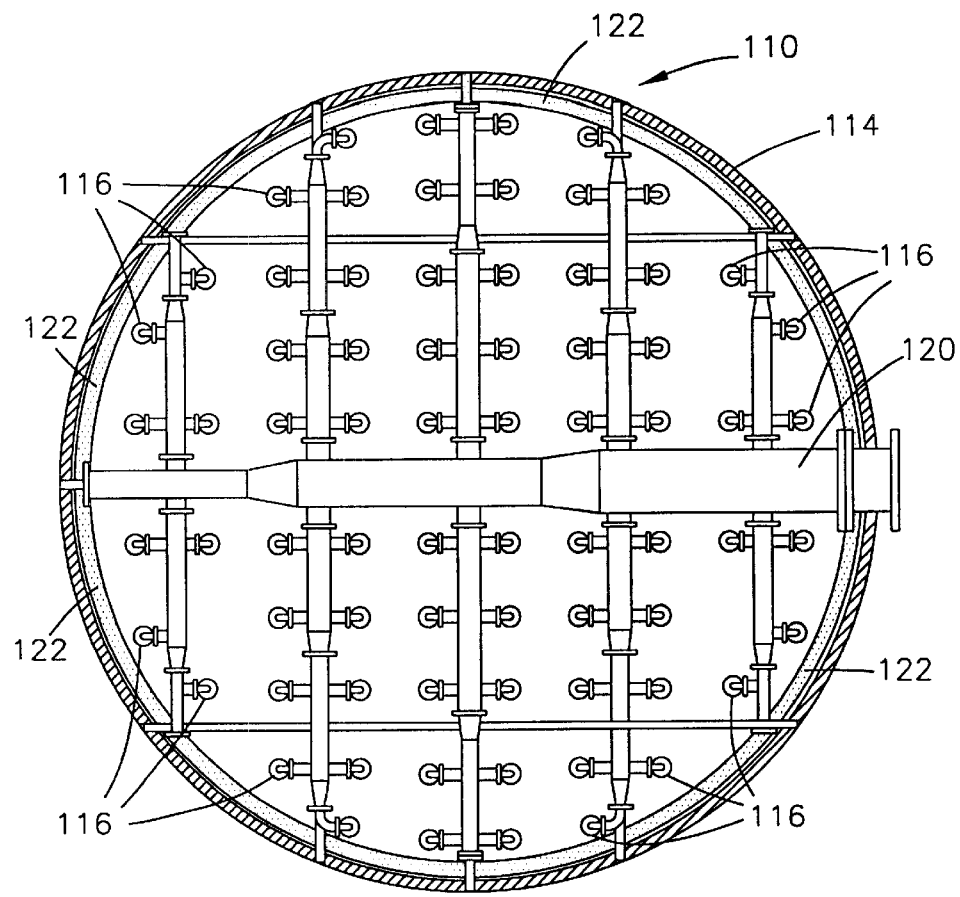
FIG. 3 shows in horizontal cross-section a spray tower in accordance with this invention.
Figure 4:
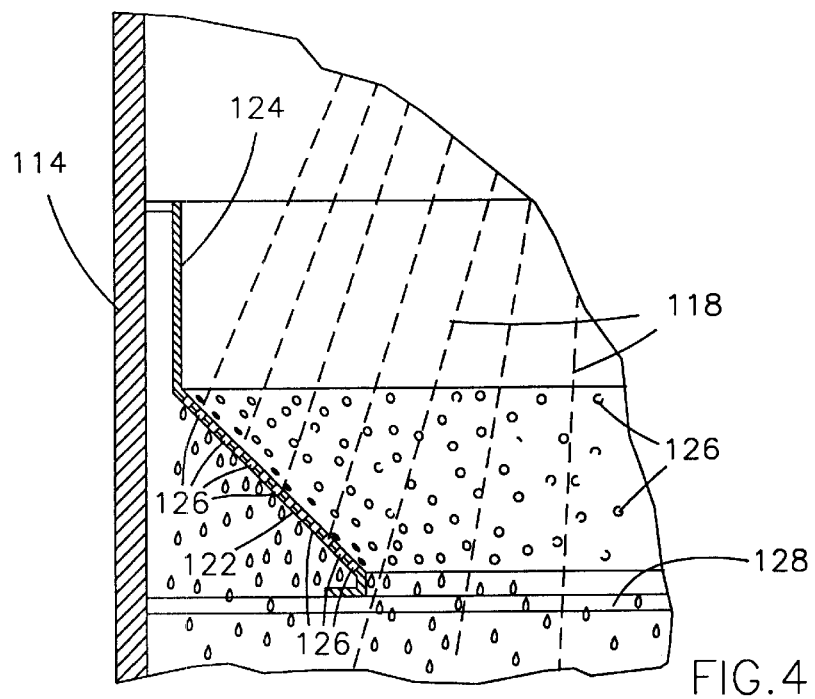
FIG. 4 shows in cross-section a wall section of the spray tower of FIG. 3.

FIGS. 3 and 4 represent a spray tower 110 of a gas-liquid contactor, more particularly an open spray absorber, in accordance with this invention. As illustrated, the tower 110 has a basic structural configuration that is similar to that of the prior art tower 10 shown in FIGS. 1 and 2. However, in accordance with this invention, the tower 110 includes an internal structure or device that significantly enhances the efficiency of the tower 110 in terms of the removal of undesirable gaseous species and/or particulate matter from flue gases flowing through the tower 110. While the tower 110 is illustrated as being of a particular construction, those skilled in the art will recognize that the teachings of this invention can be readily applied to apparatuses with different configurations yet serve to remove gases, mist, dust, fumes, smoke and/or particulate matter from a volume of gas.

The spray tower 110 shown in FIGS. 3 and 4 is generally of the type whose wall 114 forms a roughly vertical passage, through which flue gases flow for cleansing. As such, the tower 110 is equipped with an inlet duct (not shown) through which flue gases enter the tower 110. The source of the flue gases may be a process involving the combustion of fossil fuels or various industrial operations by which undesirable gases or particulate matter are produced. As with prior art spray towers of the type illustrated in FIGS. 1 and 2, the spray tower 110 shown in FIG. 3 is portrayed as having a spray header 120 equipped with a number of nozzles 116 from which a liquid is discharged into the passage. The header 120 shown in FIG. 3 is one of preferably multiple headers 120 within the tower 110. While a particular configuration for the header 120 and nozzles 116 is shown in FIG. 3, it is foreseeable that other configurations and other types of devices could be used for introducing the liquid to the tower 110, including atomizers and trays.

For purposes of removing acidic gases and/or particulate matter from flue gases, the liquid is typically an alkaline slurry, often composed of hydrated lime (calcium hydroxides; $Ca(OH)_2$) or limestone ($CaCO_3$) suspended in water, along with reaction products such as calcium sulfate and calcium sulfite, though other types of cleansing slurries and solutions are known and could be used. Typically, a pump (not shown) delivers the slurry from a reservoir or tank (not shown) to the header 120 and nozzles 116 to produce a spray 118 of the solution or slurry within the tower 110, and therefore provide for intimate contact between the slurry and the flue gases rising through the tower 110. The result is a cleansing action by which the slurry and entrapped or reacted gases are collected at the bottom of the tower 110, where the gases are reacted to form compounds that can be safely disposed or recycled.

As previously noted, even with multiple banks of nozzles 116, a true uniform slurry distribution in the tower 110 cannot be achieved due to wall effects. The sprays 118 from the nozzles 116 nearest the wall 114 impinge on the wall 114, such that the slurry flows downwardly on the surface of the wall 114 without contributing effectively to gas absorption and removal. Consequently, the spray concentration or density in an annular-shaped outer region of the passage, generally defined herein as being between the outermost nozzles 116 and the wall 114, is lower than that near the center of the tower 110. Without compensation, the lower spray density near the wall 114 would result in low resistance to gas flow, such that the flue gases would flow at relatively high velocities along the wall 114, thereby resulting in a low liquid-to-gas ratio (L/G) at the wall, high flue gas penetration through the tower 110, and reduced absorber efficiency.

During the investigation of this invention, the extent to which the above phenomenon occurs was quantified using a probe in an absorber tower through which flue gases containing sulfur dioxide were being desulfurized. The tower had a diameter of about ten meters (about thirty-three feet). In the region of the tower passage within about 1.5 meters (about five feet) of the tower wall and above the liquid spray, the concentration of $SO_2$ was measured to be about twice the average $SO_2$ concentration in the flue gases exiting the tower, and as much as about fifty times higher than the $SO_2$ concentration within the remainder of the tower. These results evidenced that most of the $SO_2$ penetration through the absorber was occurring in an annular-shaped region of the passage nearest the tower wall. In accordance with this invention, this undesirable effect is disrupted by the presence on or near the wall 114 of a structure, device or devices capable of deflecting into the passage the slurry flowing downwardly on the wall 114 and/or the slurry that would otherwise impact the wall 114 upon being discharged from the nozzles 116.

As shown in FIGS. 3 and 4, a deflecting device 122 in accordance with a preferred embodiment of the invention is in the form of a perforated plate or shelf that projects from the wall 114 into the passage. Preferably, the device 122 is annular-shaped, and is included along the entire perimeter of the wall 114. While only a single device 122 is visible in FIG. 3, the tower 110 is preferably equipped with multiple devices 122 spaced vertically apart from each other in order to form multiple sites at which liquid flowing down the wall 114 is redistributed into the passage.

As seen in FIG. 3, while the device 122 is shown as being disposed in a horizontal plane that is substantially transverse to the flow of the flue gases through the passage, the device 122 may project into the passage at an oblique angle to the wall 114 as shown in FIG. 4. A suitable range is up to about ninety degrees from vertical, with a preferred range being about forty to about ninety degrees, though it is foreseeable that lesser or greater angles could be employed. The device 122 is shown as being supported from above by a pad 124 attached to the wall 114, and from beneath by a beam 128 or other suitable support structure anchored to the wall 114. Other means of installation, fabrication and support for the device 122 are possible. With the configuration shown, slurry flowing downward along the wall 114 will flow onto the device 122, still in a downwardly direction but toward the center of the.tower 110.

Importantly, perforations 126 in the device 122 are sized to permit the slurry to pass therethrough as droplets, such that the slurry is reintroduced as droplets into the annular-shaped outer region of the passage. The perforations 126 also permit some of the flue gases flowing in the passage near the wall 114 to pass through the device 122 instead of being completely diverted around the device 122. In so doing, the flue gases flowing upward (or downward) through the device 122 contact and reintroduce some of the slurry, as droplets into the annular-shaped region. As a result, the perforations 126 in the device 122 significantly enhance contact between the slurry and the flue gases in the annular-shaped region of the passage near the wall 114, and therefore enhance the ability of the reintroduced slurry to absorb the gases and/or particulate matter entrained in the flue gases flowing through the annular-shaped outer region near the wall 114.

As can be seen from FIG. 4, any slurry not reintroduced through the perforations 126 eventually runs off the end of the device 122 some distance away from the wall 114. To promote effectiveness, the device 122 preferably projects a sufficient distance from the wall 114 in order to project through that region of the passage near the wall 114 that exhibits the greatest wall effect, i.e., the lowest L/G ratio. As indicated by FIGS. 3 and 4, the device 122 of this invention has been shown to be effective without necessarily extending completely inward to the outermost nozzles 116. As also shown in FIG. 4, the device 122 can be placed below a bank of nozzles 116 such that the spray 118 from the outermost nozzles 116 directly impinges on the device 122, thereby distributing the slurry into the annular-shaped region of the passage without first impacting the wall 114.

As described above, the device 122 of this invention serves to interrupt the surface of the wall 114 and/or intercept the spray 118 before impacting the wall 114 to an extent sufficient to increase the density of liquid and reduce the flow of gases within the annular-shaped region of the passage near the wall 114 that would otherwise be characterized by low liquid density and high gas penetration within the tower 110. As such, the device 122 provides for a distribution of slurry within the tower 110 that more closely corresponds to the flue gas distribution within the tower 110. As a result, a gas-liquid contactor configured in accordance with this invention exhibits greater efficiency than prior art gas-liquid contactors of similar design.

While the device 122 is shown as a plate in FIGS. 3 and 4, numerous other structures and configurations could be used. For example, the device 122 could be modified to include surface or structural irregularities other than or in combination with perforations 126, or could be in the form of bars or a mesh, while retaining the desired function of inducing the formation and distribution of droplets that are deflected or otherwise reintroduced into the gas stream within the annular-shaped outer region of the passage nearest the wall 114.

While our invention has been described in terms of preferred embodiments, it is apparent that other forms could be adopted by one skilled in the art, such as by incorporating the novel features of this invention within spray towers and other gas-liquid contactors that structurally differ from that shown in the Figures. Accordingly, the scope of our invention is to be limited only by the following claims.

What is claimed is:

1. A gas-liquid contactor comprising:
   a tower having a wall forming a passage within the tower;
   an inlet to the passage through which flue gases are introduced into the tower such that the flue gases flow vertically upward through the passage;
   means for introducing a liquid into the passage such that the liquid contacts the flue gases therein, a portion of the liquid contacting the wall such that the portion of the liquid flows on the wall; and
   means disposed on the wall of the tower for deflecting the portion of the liquid away from the wall and reintroducing at least some of the portion of the liquid as droplets into the passage, the deflecting means having unobstructed holes therethrough through which the flue gases flow upwardly to introduce at least some of the portion of the liquid as droplets into the passage.

2. A gas-liquid contactor as recited in claim 1, wherein the deflecting means is continuous along a perimeter of the wall.

3. A gas-liquid contactor as recited in claim 1, wherein the deflecting means is disposed in a plane that is substantially transverse to the flow of the flue gases through the passage.

4. A gas-liquid contactor as recited in claim 1, wherein the deflecting means comprises a member projecting into the passage from the wall.

5. A gas-liquid contactor as recited in claim 4, wherein the member is continuous along a perimeter of the wall.

6. A gas-liquid contactor as recited in claim 4, wherein the member projects into the passage from the wall at an oblique angle to the wall.

7. A gas-liquid contactor as recited in claim 1, wherein an annular-shaped region of the passage nearest the wall is characterized by a lower concentration of liquid from the introducing means, the deflecting means causing the portion of the liquid to be reintroduced as droplets into the annular-shaped region.

8. A gas-liquid contactor as recited in claim 1, wherein the deflecting means comprises multiple devices projecting into the passage from the wall, the devices being vertically spaced apart from each other.

9. A gas-liquid contactor as recited in claim 1, wherein the deflecting means reintroduces at least some of the portion of the liquid a distance from the wall.

10. A wet flue gas desulfurization apparatus comprising:
    a tower having a wall forming a cylindrical passage within the tower;
    an inlet to the passage through which flue gases are introduced into the tower such that the flue gases flow upward through the passage;
    means for spraying a liquid into the passage such that the liquid flows downwardly through the passage and contacts the flue gases therein, an annular-shaped region of the passage nearest the wall being characterized by a lower concentration of the liquid from the spraying means; and
    at least one deflecting member projecting into the passage from the wall at an oblique angle to the wall for deflecting the liquid away from the wall and reintroducing a portion of the liquid as droplets into the passage, each of the at least one deflecting member being located below at least one of the spraying means, each of the at least one deflecting member having unobstructed holes therethrough through which the flue gases flow upwardly to introduce at least some of the portion of the liquid as droplets into the passage, the holes being sized to permit some of the liquid to flow therethrough as droplets such that the liquid is reintroduced as droplets into the annular-shaped region of the passage below the at least one deflecting member, the at least one deflecting member further reintroducing some of the portion of the liquid a distance from the wall.

11. A wet flue gas desulfurization apparatus as recited in claim 10, wherein the at least one deflecting member is continuous along a perimeter of the wall.

12. A wet flue gas desulfurization apparatus as recited in claim 10, wherein the at least one deflecting member is disposed in a substantially horizontal plane.

13. A wet flue gas desulfurization apparatus as recited in claim 10, wherein each of the at least one deflecting member is located relative to the spraying means such that the liquid discharged from the spraying means impinges the at least one deflecting member prior to contacting the wall.

* * * * *